M. A. SHEPARD.
Producing Heat and Ventilation.
No. 213,138. Patented Mar. 11, 1879.
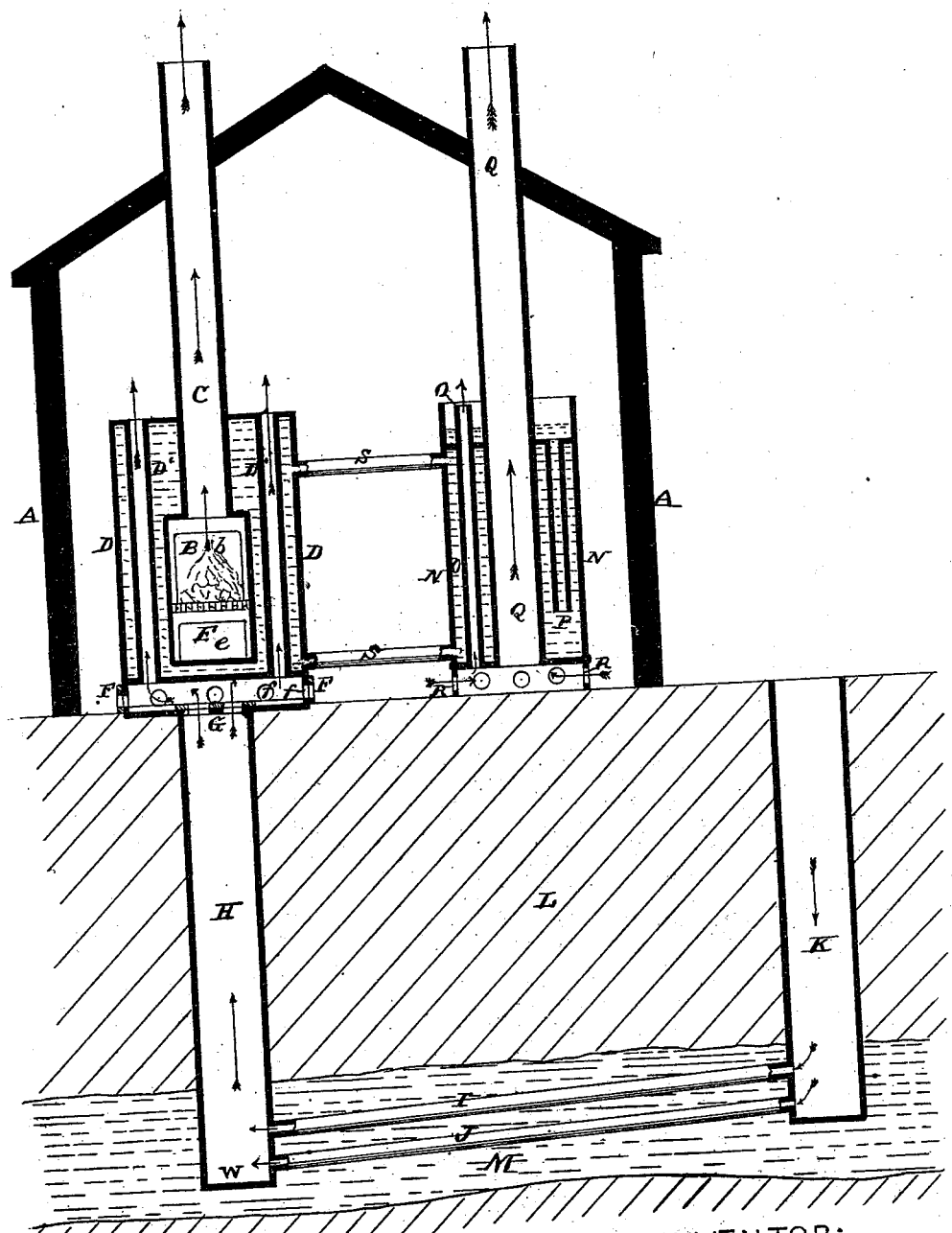
ATTEST:
Robert Burns
Charles Pickles
INVENTOR:
Morrill A. Shepard

UNITED STATES PATENT OFFICE.

MORRILL A. SHEPARD, OF LEBANON, ILLINOIS.

IMPROVEMENT IN PRODUCING HEAT AND VENTILATION.

Specification forming part of Letters Patent No. 213,138, dated March 11, 1879; application filed August 1, 1878.

*To all whom it may concern:*

Be it known that I, MORRILL A. SHEPARD, of the city of Lebanon, in the county of St. Clair and State of Illinois, have invented a new and useful Improvement to Produce Heat and Ventilation, which improvement is fully set forth in the following specification, reference being had to the accompanying drawing, forming a part of the same.

The drawing is a vertical section of my invention.

The first object of my invention is to gather from the great storehouse of nature an atmosphere of nearly uniform temperature all the year, and use it for the profit and comfort of mankind.

In order to accomplish this, shafts or pipes K and H are sunk in the ground L, when not used in connection with a large body of water, as shown in the drawing, sufficient to reach a living stream or spring of water, which are connected through a tunnel underground by a series of pipes, I and J, which are submerged in the living water M, which at all times remains at about a uniform temperature. Now, as the air is drawn or forced down the shaft K—say, when the temperature is 30° below zero—it will enter the pipes I and J, whose surrounding temperature of water is at 50° above zero, as the water around the pipes is continually in motion passing from the warm earth into the warm earth. The air, by the time it passes through the pipes I and J into the ascending shaft H, will have changed its temperature, say, 40° to 50°. At this greatly-reduced temperature the air is now prepared to enter the register at G into the heater D D.

It is apparent that, in order to produce this great reduction of temperature in the air in cold weather on an extensive scale, to supply cities that are located on or near rivers or any large bodies of living water, the shaft K may be built as a coffer-dam in such bodies of water; and to it can be connected a series of pipes, I and J, at or near the bottom of said bodies of water, and then connected with the shaft H, which may have numerous connections, similar to gas-pipes, by which any number of houses or rooms may be supplied with air reduced from a cold or warm state to a moderate temperature. As the mean temperature of most bodies of water at or near the bottom, or living springs of water under ground, will range about 40° to 60°, this part of my improvement will not only be useful in reducing the temperature of air to supply buildings in cold weather, thereby saving an immense per cent. of fuel that would be required to raise the air to an equal temperature, but in warm weather the same arrangement can be used to supply air at a temperature of 40° to 60° to buildings and rooms whose inmates may be suffering from a summer heat ranging from 85° to 110°.

The second object of my improvement is to produce a healthy and pleasant elevation of temperature in cold weather in all rooms requiring such, and not injure the elementary principles of the air while doing so. This result is brought about by the use of a heater or boiler, D D, through which is placed a series of air-tubes, D' D', and in the same a fire-chamber, B, with door, grate, ash-pan, and smoke-pipe C, and at bottom a base with register F F, with air-vents *f f*, to allow a supply of air. When not required to be supplied at G, the heater D D is then filled with water, and fire built in the internal chamber B. As soon as the water becomes hot in the heater D D, the air in the tubes D' D' becomes warm and rushes upward, and the cold air near the floor will rush in at the ventilator *f f*, when not admitted at G, and supply the tubes with air. By this process the air in a room will be continually mixed by virtue of the strong draft produced by the upward current of air in the pipes D' D', which will necessarily produce a downward draft from near ceiling, to supply the continual base-draft. By this process of rapidly heating air by hot water, by an internal fire, and at the same time creating currents of air through the tubes in the heater, which, necessarily, will produce constant changes of the air in the rooms from top to bottom, and as none of this air in process of heating will come in contact with metal surfaces hotter than 212°, it is apparent that all the unhealthy and unpleasant effects of air coming in contact with red-hot stoves and heaters will be obviated. This heater or boiler D D may be made in any desirable shape and height, and placed vertical or horizontal, with the internal fire-chambers surrounded by water and air-tubes D′ D′, if horizontal, placed in vertical rows on each side of the fire-chamber, and arranged so as to admit the cold air at bottom, and then the air, as it is warmed in passing through these tubes, may enter a hot-air chamber, from which the air thus warmed may be conducted by pipes to rooms to suit.

The third object of my invention is to draw off the foul gases that hover near the floor of a room. This is done either by an extra draft-pipe, Q, placed within the heater D D, connecting it with the smoke-pipe C, or, when a more extensive heating apparatus is required, I connect to my heater D D pipes S S′, which connect with a separate vessel, N N, made similar to the heater, with a series of tubes, O, for the circulation of hot air. At the top of the same is a reservoir, at the bottom of which the tube P is connected for water-supply, and in case of an accumulation of steam it will escape from this pipe P through the interior of this vessel N N. The foul-gas pipe Q is placed extending out of the building.

When the water in the heater D D becomes hot it will overflow at S and pass into this vessel N N, and the colder water at the bottom of the same will pass out through S′ into the heater D D. These pipes S S′ may be laid under the floor, and above, near the ceiling, so as to conduct the water and not interfere with the room. When the water becomes hot the internal pipe Q will become quite warm, and the air the same, by its rarity, will escape, creating a partial vacuum, and the foul gases near the floor will rush in at the openings R R and be drawn up by the draft and conducted outside the building.

I claim as my invention—

1. The air-shaft K and H, connected by an air-pipe or series of pipes, I and J, which are submerged in a body of water, substantially for the purpose as described and set forth.

2. The heater or boiler D D, a series of internal air-pipes, D′ D′, fire-chamber B, smoke-pipe C, register F F, ventilating-holes $f f$ and G, all substantially for the object as described and set forth.

3. In combination with the heater D D, the exhaust-vessel N N, with air-tubes O, supply and escape pipe P, reservoir, foul-air-draft pipe Q, register R, and connecting water-pipes S S′, all substantially for the purpose as described and set forth.

4. In combination with the air-shaft K and H and air-pipes I and J, body of water M, their connection with the heater D D, in which are air-tubes D′ D′, fire-box B, pipe C, and connected to it the vessel N, pipes O, supply-pipe P, draft-pipe Q, with connecting-pipes S S′, all substantially for the purpose specified.

MORRILL A. SHEPARD.

Witnesses:
  GEO. F. LANE,
  LOUIS ZERWECK.